United States Patent
Nishikawa et al.

(10) Patent No.: US 6,456,359 B1
(45) Date of Patent: *Sep. 24, 2002

(54) PHOTOGRAPH PRINTING DEVICE

(75) Inventors: Hidetoshi Nishikawa; Kazuya Tsukamoto, both of Wakayama (JP)

(73) Assignee: Noritsu Koki Co, LTD, Wakayama (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 43 days.

(21) Appl. No.: 09/366,023

(22) Filed: Aug. 2, 1999

(30) Foreign Application Priority Data

Aug. 4, 1998 (JP) ............................................ 10-220549

(51) Int. Cl.⁷ ....................... G03B 27/52; G03B 27/54; G03B 27/72; G02B 26/08
(52) U.S. Cl. .............................. 355/43; 355/67; 355/71; 359/298
(58) Field of Search .............................. 355/43, 67, 71; 348/751, 756, 761, 766; 359/629, 630, 196, 212, 223, 225, 237, 245, 263, 298, 303, 85

(56) References Cited

U.S. PATENT DOCUMENTS

| | | | | |
|---|---|---|---|---|
| 4,956,619 A | * | 9/1990 | Hornbeck | 359/317 |
| 5,061,049 A | * | 10/1991 | Hornbeck | 359/224 |
| 5,083,857 A | * | 1/1992 | Hornbeck | 359/291 |
| 5,467,146 A | * | 11/1995 | Huang et al. | 348/746 |
| 5,539,568 A | * | 7/1996 | Lin et al. | 359/285 |
| 5,621,486 A | * | 4/1997 | Doany et al. | 348/756 |
| 5,757,348 A | * | 5/1998 | Handschy et al. | 345/89 |
| 5,808,500 A | * | 9/1998 | Handschy et al. | 359/630 |
| 5,844,588 A | * | 12/1998 | Anderson | 348/135 |
| 5,914,817 A | * | 6/1999 | Browning et al. | 359/634 |
| 5,933,183 A | * | 8/1999 | Enomoto et al. | 347/241 |
| 5,936,708 A | * | 8/1999 | Saita | 355/20 |
| 6,147,790 A | * | 11/2000 | Meier et al. | 359/291 |
| 6,163,363 A | * | 12/2000 | Nelson et al. | 355/32 |

FOREIGN PATENT DOCUMENTS

| | | |
|---|---|---|
| JP | 8-262582 | 10/1996 |
| JP | 9-160140 | 6/1997 |
| JP | 9-160141 | 6/1997 |
| JP | 9-164723 | 6/1997 |
| JP | 9-164727 | 6/1997 |

\* cited by examiner

*Primary Examiner*—Russell Adams
*Assistant Examiner*—Rodney Fuller
(74) *Attorney, Agent, or Firm*—Dike, Bronstein, Roberts & Cushman IP Group Edwards & Angell, LLP; David G. Conlin; David A. Tucker

(57) ABSTRACT

A PBS for guiding light from a light source to a DMD as light modulating means as well as for guiding light modulated by the DMD to photographic paper is provided on an optical path between the light source and the DMD. The DMD is arranged so that light from the PBS perpendicularly enters itself, and is equipped with a plurality of micromirrors which swing in accordance with image data. This arrangement allows optical components to be disposed so that an angle of incidence of light with respect to the DMD is 0°, thereby enabling tight layout of the light source section. In other words, there is no need to spread the optical components around the light modulating means like in the conventional cases where an angle of incidence with respect to the light modulating means is more or less required. Besides, since the micromirrors are positioned so as to be substantially symmetric with respect to an optical axis connecting the PBS and the DMD, respective distances from the light source to the micromirrors are substantially equal.

13 Claims, 7 Drawing Sheets

PHOTOGRAPH PRINTING DEVICE

FIELD OF THE INVENTION

The present invention relates to a photograph device for printing an image on photographic paper by exposing the photographic paper as a photosensitive material by means of an image display device such as a digital micromirror device (hereinafter referred to as DMD) or a reflection-type liquid crystal display device.

BACKGROUND OF THE INVENTION

Conventionally, various photograph printing devices each equipped with a DMD as means for displaying images have been proposed. The DMD is, as shown in FIGS. 6(a) and 6(b), a device equipped with a plurality of micromirrors 51 which are extremely small. Each micromirror 51 is installed on a substrate 53 through a post 52, and is swingable with respect to the substrate 53. The DMD is arranged so as to control inclination of the micromirrors 51 in accordance with inputted image data so as to change directions of reflection of light, whereby exposure of photographic paper is controlled.

In other words, during exposure of the photographic paper, as shown in FIG. 6(a), the micromirror 51 is inclined clockwise as viewed in the figure through an angle of θ (inclined through an angle of −θ) with respect to a surface of the substrate 53, thereby reflecting the light from a light source toward the photographic paper. On the other hand, during non-exposure of the photographic paper, as shown in FIG. 6(b), the micromirror 51 is inclined anti-clockwise as viewed in the figure through an angle of θ (inclined through an angle of +θ) with respect to the surface of the substrate 53, thereby reflecting the light from the light source in a direction different from the direction toward the photographic paper. Incidentally, the micromirror 51 exhibits either the state shown in FIG. 6(a) or that shown in FIG. 6(b) when the power source of the device is in an ON state or in an OFF state.

Photograph printing devices using such DMDs are disclosed by the Japanese Publications for Laid-Open Patent Applications No. 262582/1996 (Tokukaihei 8-262582, Date of Publication: Oct. 11, 1996), No. 160140/1997 (Tokukaihei 9-160140, Date of Publication: Jun. 20, 1997), No. 160141/1997 (Tokukaihei 9-160141, Date of Publication: Jun. 20, 1997), No. 164723/1997 (Tokukaihei 9-164723, Date of Publication: Jun. 24, 1997), and No. 164727/1997 (Tokukaihei 9-164727, Date of Publication: Jun. 24, 1997). Any one of these prior art publications disclose an arrangement wherein, as shown in FIG. 7, during exposure of photographic paper 61, micromirrors (not shown) provided in a DMD 63 are inclined through a predetermined angle with respect to a surface of a substrate so that light from a light source 62 is reflected by the DMD 63 in a direction toward the photographic paper 61, while during non-exposure of the photographic paper 61 the micromirrors are inclined with respect to the substrate surface so that the light from the light source 62 is reflected in a direction toward a light absorbing plate 64 (an optical path is directed toward an OFF side).

Furthermore, a condenser lens 65 is provided between the light source 62 and the DMD 63 so as to converge the light from the light source 62 and project it onto the DMD 63. The condenser lens 65 is in a shape such that, to avoid interference with a part of light which has been reflected by the DMD 63 and is going toward the photographic paper 61, a portion thereof which would cause the foregoing interference is cut out. A broken line in the figure indicates the portion (the cutout portion of the condenser lens 65 which would cause interference.

Incidentally, though not shown in the figure, optical components such as a light adjusting filter, a heat-resistant filter, and a balance filter may be provided as required, between the light source 62 and the DMD 63. The light adjusting filter is to take out color lights R (red), G (green), and B (blue) from white light emitted by the light source 62. The heat-resistant filter is to cut off infrared, and the balance filter is to perform shading correction so that light is projected on the surface of the DMD 63 with a uniform illuminance. On the other hand, between the DMD 63 and the photographic paper 61, a projection lens, a negative film, or the like is provided as required.

However, to realize the foregoing conventional arrangement wherein the light from the light source 62 is made incident obliquely with respect to the DMD 63, it is necessary to arrange the optical components so that light is made. incident to the DMD 63 at a certain angle of incidence. Therefore, a space required to dispose the optical components becomes larger, thereby causing the device to become bulkier.

Incidentally, for example, an arrangement wherein a distance between the light source 62 and the DMD 63 is shortened so as to avoid the foregoing problem may be devised. However, since there are when necessary provided the foregoing optical components between the light source 62 and the DMD 63, there are limits to the shortening of the distance between the light source 62 and the DMD 63. Furthermore, the same also applies to the shortening of the distance between the DMD 63 and the photographic paper 61. Therefore, it is impossible to make the device drastically smaller by this method.

SUMMARY OF THE INVENTION

The object of the present invention is to provide a photographic printing device which is equipped with an image displaying device such as a DMD and is formed remarkably compact.

To achieve the foregoing object, a photograph printing device of the present invention, which is a photograph printing device for printing an image by exposing a photosensitive material, is characterized by comprising (i) a light source, (ii) light modulating means for modulating light from the light source at each pixel in accordance with image data, and (iii) an optical element for guiding the light from the light source to the light modulating means, while guiding light modulated by the light modulating means to the photosensitive material, the optical element being positioned in an optical path between the light source and the light modulating means.

With the foregoing arrangement, light from the light source is projected through the optical element to the light modulating means, which modulates the light in accordance with image data. Among the light modulated, the light reaching the optical element is guided by the optical element to the photosensitive material. As a result, an image in accordance with the image data is printed on the photosensitive material.

More specifically, light projected from the optical element to the light modulating means, after being modulated by the light modulating means in accordance with the image data, goes through the substantially same region as the optical path region of the incident light, thereby again entering the optical element. Therefore, the angle of incidence and the angle of outgoing of light at the light modulating means do not have to be made greatly different from each other, unlike in the conventional arrangements, and hence a large space is not required for arrangement of the constituent components. In other words, as compared with the foregoing arrangement, the space for arrangement of the constituent components can be made smaller, resulting in that the device can be made remarkably compact as compared with the conventional cases.

For a fuller understanding of the nature and advantages of the invention, reference should be made to the ensuing detailed description taken in conjunction with the accompanying drawings.

DESCRIPTION OF THE PREFERRED EMBODIMENTS

The following description will explain an embodiment of the present invention while referring to FIGS. 1 through 5.

Figure 3:
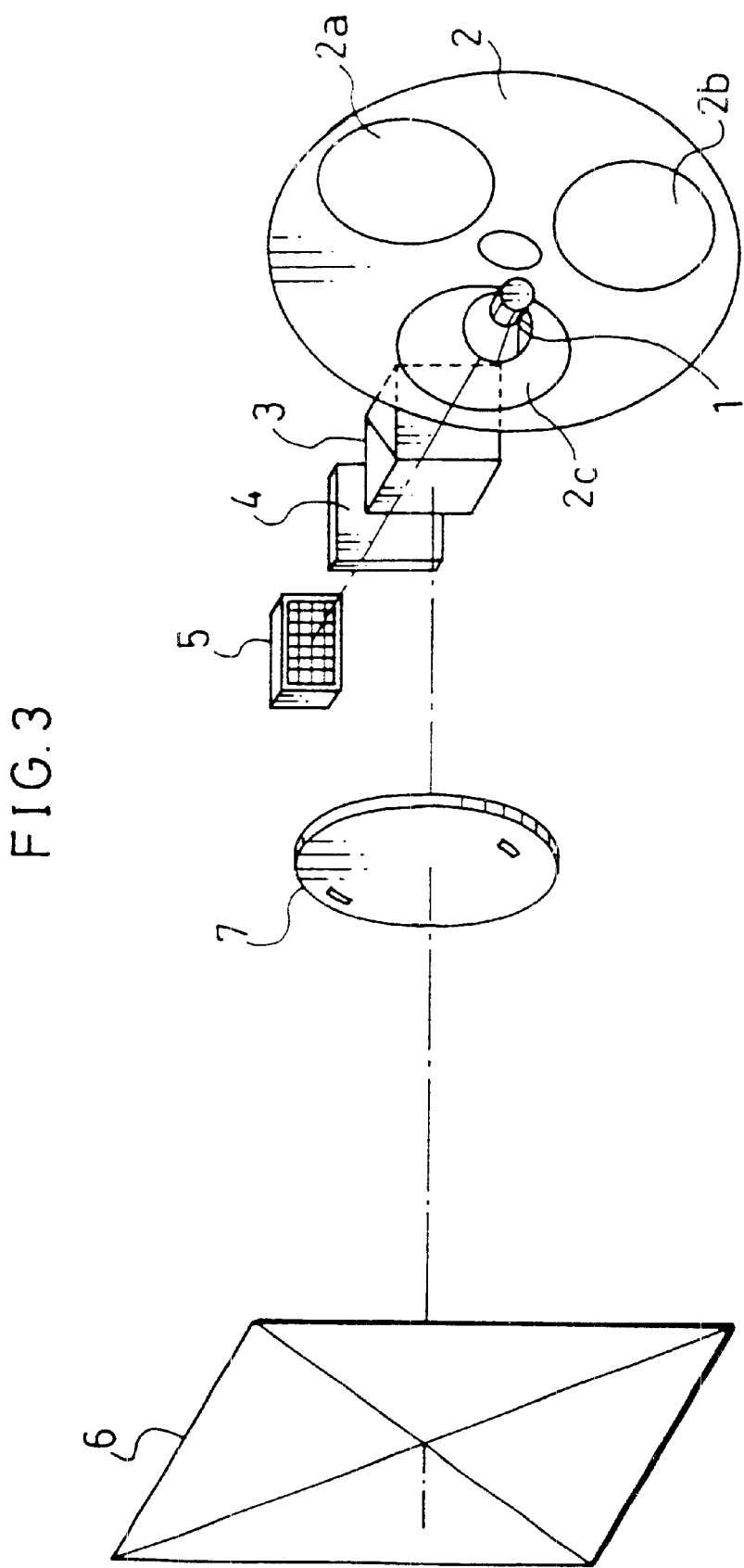
FIG. 3 is a perspective view illustrating a schematic arrangement of the foregoing photograph printing device.
Figure 4:
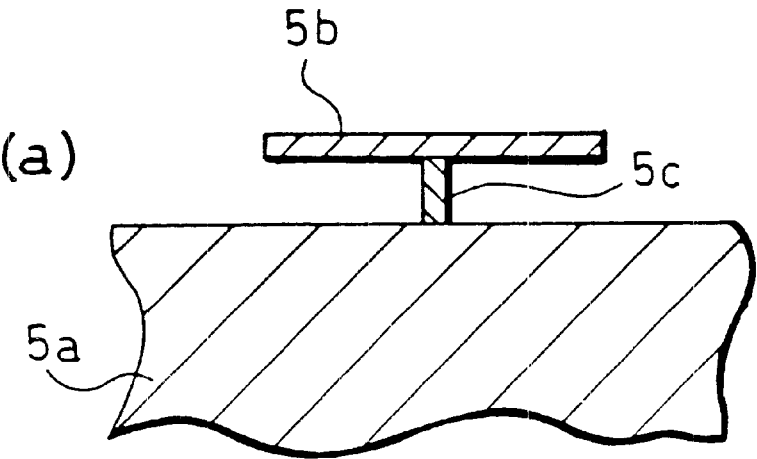
FIG. 4(a) is a cross-sectional view illustrating a state of a micromirror during exposure of the photographic paper in the foregoing photograph printing device.
FIG. 4(b) is a cross-sectional view illustrating a state of the micromirror during non-exposure of the photographic paper in the same device.
Figure 4:
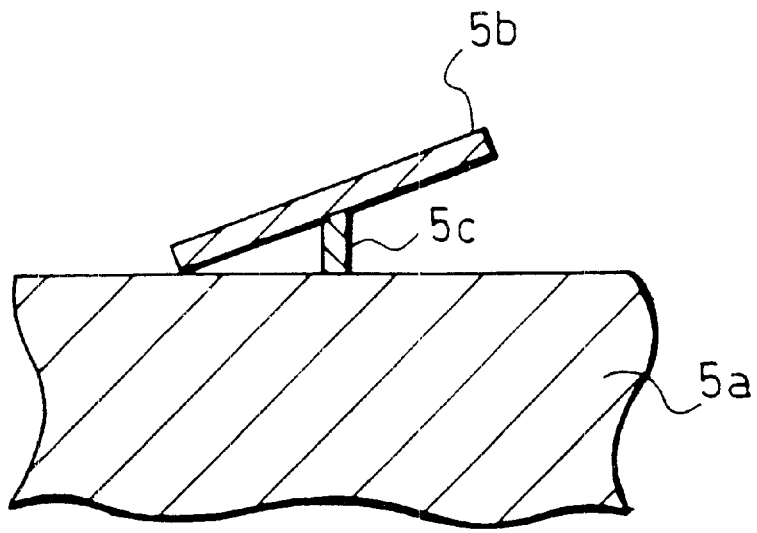

A photograph printing device in accordance with the present embodiment is arranged, as shown in FIG. 3, so that a BGR wheel 2, a polarizing beam splitter (hereinafter referred to as PBS) 3, and a quarter wave length plate (phase difference generating means) 4 are linearly provided in this order on an optical path connecting a light source 1 and a DMD 5 (light modulating means).

The light source 1 emits white light, and is composed of a halogen lamp, for example. The BGR wheel 2 is a rotational plate having color filters 2a, 2b, and 2c which correspond to blue (B), green (G), and red (R), respectively, and is arranged so that any one of the color filters is positioned on the optical path connecting the light source 1 and the PBS 3 depending on the rotated state of the rotational plate. With this, blue-color light, green-color light, and red-color light are in turn projected onto the photographic paper 6, thereby enabling the printing of a color image.

The PBS 3 is an optical element for guiding to the DMD 5 the light from the light source 1 which is incident thereto after having passed through the BGR wheel 2, and also guiding to the photographic paper 6 the light which is incident thereto after having been reflected by the DMD 5. More specifically, among the light from the light source 1 which has passed through the BGR wheel 2, the PBS 3 lets only P polarized light therethrough toward the DMD 5. The P polarized light having passed through the PBS is transmitted through the quarter wave length plate 4, then, becomes reflected by the DMD 5, and again passes through the quarter wave length plate 4, thereby becoming an S polarized light. The PBS 3 reflects the incident S polarized light in a direction toward the photographic paper 6. Incidentally, the foregoing P polarized light refers to linearly polarized light whose electric vector has an oscillation direction parallel with a plane of incidence of the PBS 3, and the foregoing S polarized light refers to linearly polarized light whose plane of polarization (plane of oscillation) is orthogonal to that of the P polarized light.

The reason why the PBS 3 which is a known optical component can, as an optical element, be provided thus on an optical path between the light source 1 and the DMD 5 is that the quarter wave length plate 4 which is described below is provided on the optical path between the PBS 3 and the DMD 5.

The quarter wave length plate 4 causes a phase difference of $\pi/2$ (quarter wave length) between a wave length of a vertical component and that of a horizontal component of the linearly polarized light incident thereto In the present embodiment, as described later, light is projected onto the photographic paper 6 after having been transmitted through the quarter wave length plate 4 twice in going and returning. Therefore, there occurs a phase difference of one half wave length between the foregoing two components. As a result, in the case where light entering the quarter wave length plate 4 is P polarized light, it becomes S polarized light through the twice transmission, while in the case where light entering the same is S polarized light, it becomes P polarized light through the twice transmission.

Thus, since the provision of the quarter wave length plate 4 enables utilization of linearly polarized lights with different planes of polarization, the known PBS 3 which lets one linearly polarized light therethrough while reflects the other linearly polarized light can be used as the foregoing optical element. As the phase difference generating means, apart from the foregoing quarter wave length plate 4, anything may be used as long as with respect to light before being transmitted through the phase difference generating means, it produces a phase difference between a horizontal component and a vertical component of the foregoing light, the phase difference being an odd number of times of one half wave length.

The DMD 5 changes the direction of reflection of light from the light source 1 at each pixel in accordance with image data, and is arranged so that the light from the PBS 3 is made incident perpendicularly onto the surface of the substrate of the DMD 5. The DMD 5 is, as shown in FIGS. 4(a) and 4(b), provided with a substrate 5a, a plurality of memory cells (not shown) arranged in a matrix form on the substrate 5a, and a plurality of micromirrors 5b respectively corresponding to the memory cells. Incidentally, FIGS. 4(a) and 4(b) illustrate one micromirror 5b and the arrangement in the vicinity of the same.

The substrate 5a is provided so that its surface crosses at a right angle an optical axis connecting the PBS 3 and the DMD 5. Each micromirror 5b is swingably provided on the substrate 5a with a post 5c provided therebetween. One micromirror 5b corresponds to one pixel.

The micromirrors 5b are disposed so as to be substantially symmetric with respect to the optical axis connecting the PBS 3 and the DMD 5. Conventionally, since incident light is made obliquely incident to a DMD, distances from a light source to micromirrors (optical path lengths) differ from each other depending on positions of the micromirrors, thereby resulting in that unevenness of exposure occurs to a printed image. In contrast, it can be considered that the arrangement of the micromirrors 5b as in the present embodiment has substantially no difference in respective distances between the light source 1 and the micromirrors 5b. Therefore, unevenness of exposure stemming from differences in optical path lengths can be suppressed.

Incidentally, as long as respective distances between the light source 1 and the micromirrors 5b are substantially equal, the micromirrors 5b may be positioned more or less asymmetrically with respect to the optical axis connecting the PBS 3 and the DMD 5.

The unevenness of exposure can be more or less reduced by providing a balance filter in the optical path, but this is not preferable since the device is made bulkier due to the increase in the number of components constituting the device. In contrast, the foregoing arrangement of the present embodiment enables suppression of unevenness of exposure without providing the balance filter, that is, without making the device bulkier.

The DMD 5 is equipped with a controller (not shown), which performs such controls as supply of binary signals to the forementioned memory cells according to the image data whereby the micromirrors 5b corresponding to the foregoing memory cells are caused to swing. Upon supply of a signal of either "1" or "0" from the controller to each memory cell according to the image data, electrostatic attraction or repulsion occurs between the memory cell and the corresponding micromirror 5b, thereby causing the micromirror 5b to swing.

More specifically, for exposure of the photographic paper 6, a signal of, for example, "1" is supplied from the con roller to a memory cell corresponding to a pixel which is to project light to the photographic paper 6. Then, a micromirror 5b corresponding to the foregoing memory cell is driven so as to become parallel with the substrate 5a, or in other words, so as to be perpendicular to the optical axis connecting the PBS 3 and the substrate 5a (see FIG. 4(a)). With this, light incident on the micromirror 5b is reflected in a direction opposite to the direction of incidence, thereby proceeding in a direction toward the PBS 3.

On the other hand, for non-exposure of the photographic paper 6, a signal of, for example, "0" is supplied from the controller to a memory cell corresponding to a pixel which is not to project light to the photographic paper 6. Then, a micromirror 5b corresponding to the foregoing memory cell is driven so as to incline through a predetermined angle with respect to the substrate 5a (see FIG. 4(b)). With this, light reflected by the micromirror 5b deviates from the optical path connecting the same micromirror 5b and the PBS 3, thereby not to reach the photographic paper 6.

Thus, the present photograph printing device is arranged so that light from the light source 1 is reflected by the DMD 5 in the direction to the PBS 3 only upon exposure of the photographic paper 6. In other words, the present device differs from the prior art in that light from the light source 1 is incident perpendicularly with respect to the DMD 5 while light used for exposure outgoes perpendicularly from the DMD 5, or state differently, that an optical path of light before incidence to the DMD 5 and an optical path of exposure-used light after reflection by the DMD 5 fall on each other.

Incidentally, each micromirror 5b is arranged so as to be driven by the controller to take either the state shown in FIG. 4(a) or that shown in FIG. 4(b) when the power source of the device is in the ON state or in the OFF state.

Furthermore, as shown in FIG. 3, a printing lens (also called as enlargement lens) 7 is provided in the optical path between the PBS 3 and the photographic paper 6, so that light from the PBS 3 to the photographic paper 6 is enlarged by the printing lens 6 and projected onto the photographic paper 6. Note that, needless to say, the photographic paper 6 is not positioned on the optical path connecting the light source 1 and the DMD 5.

Figure 1:
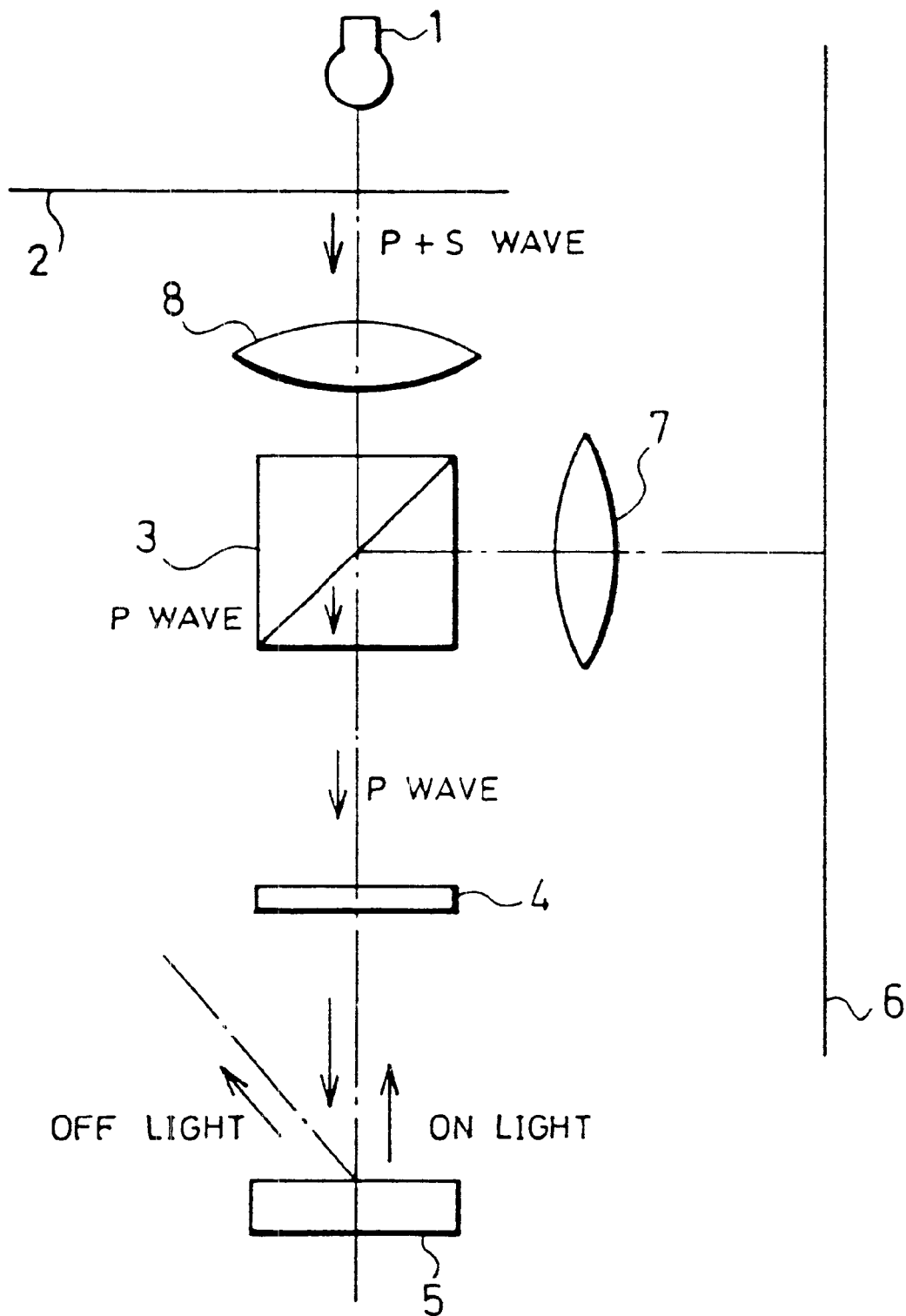
FIG. 1, illustrating an example of an arrangement of a photograph printing device in accordance with the present invention, is an explanatory view illustrating how light from a light source is guided to a DMD.
Figure 2:
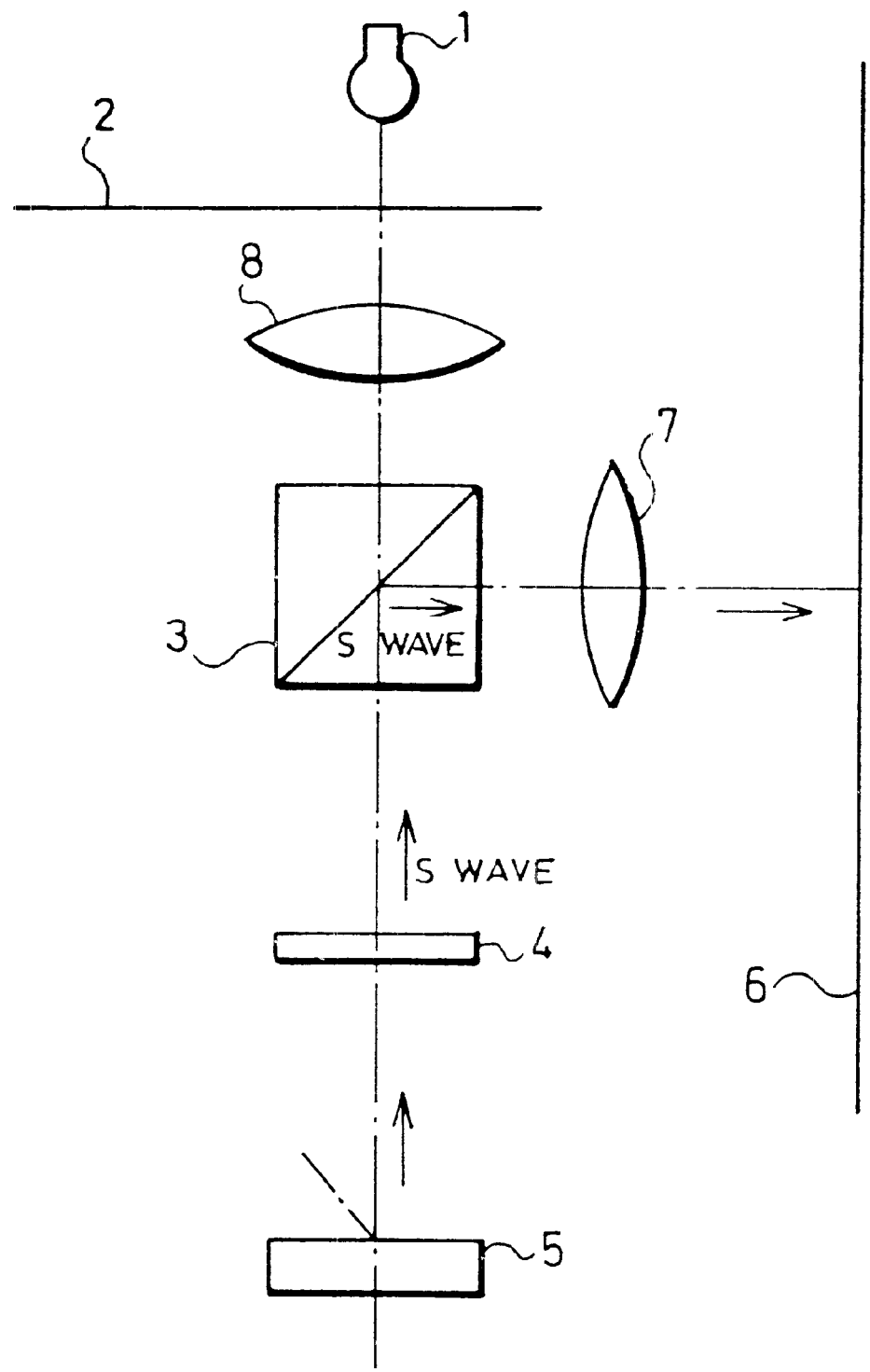
FIG. 2 is an explanatory view illustrating how light reflected by the DMD is guided to photographic paper in the foregoing photograph printing device.

Furthermore, as shown in FIGS. 1 and 2, a condenser lens 8 is provided on the optical path between the BGR wheel 2 and the PBS 3, so that light from the light source 1 is converged by the condenser lens 8 and is supplied to the PBS 3. In the present embodiment, since the condenser lens 8 is positioned off the optical path connecting the DMD 5, the PBS 3, and the photographic paper 6, light after reflection by the DMD never enters the condenser lens 8 before reaching the photographic paper 6. Incidentally, in FIG. 3, the condenser lens 8 is not shown so as to avoid causing the drawing to become complicated.

Next, operations of the foregoing photograph printing device will be explained with reference to FIGS. 1 and 2.

Upon emission of light from the light source 1, white light from the light source 1 is transmitted through for example, the color filter 2a of the BGR wheel 2 (see FIG. 3), thereby becoming blue light, which then enters the PBS 3. Here, the foregoing blue light is converged by the condenser lens 8, thereby becoming substantially collimated light, which enters the PBS 3.

Here, the light entering the PBS 3 is composed of P polarized light and S polarized light (in the figures referred to as "P wave"and "S wave," respectively), but the PBS 3 functions so as to let only the P polarized light therethrough, allowing the same to reach the quarter wave length plate 4. The foregoing P polarized light transmitted through the quarter wave length plate 4, and thereby becomes light whose vertical component and horizontal component have a phase difference of one quarter wave length, which light is then made incident onto the DMD 5. In the DMD 5, a signal in accordance with image data is applied by the controller to each memory cell, and an inclination angle of a micromirror 5b corresponding to the memory cell is determined.

For non-exposure of the photographic paper 6, a signal of "0" is supplied from the controller to memory cells corresponding to a portion of the photographic paper 6 not to be exposed, and micromirrors 5b corresponding to the foregoing memory cells incline through a predetermined angle with respect to the substrate 5a. With this, light transmitted through the quarter wave length plate 4 is reflected by the micromirror 5b and deviates from the optical path connecting the DMD 5 and the PBS 3. As a result, the foregoing light does not reach the photographic paper 6 via the PBS 3 (see OFF light in the foregoing figure).

On the other hand, for exposure of the photographic paper 6, a signal of "1" is supplied from the controller to memory cells corresponding to a portion of the photographic paper 6 to be exposed, and micromirrors 5b corresponding to the foregoing memory cells become parallel with respect to the surface of the substrate 5a. With this, light transmitted through the quarter wave length plate 4 is reflected by the micromirrors 5b in a direction (toward the PBS 3) opposite to the direction of incidence, thereby again entering the quarter wave length plate 4 (see ON light in the foregoing figure). The quarter wave length plate 4 again imparts a phase difference of one quarter wave length between the vertical component and the horizontal component. As a result, light outgoing from the quarter wave length plate 4 toward the PBS 3 has become the S polarized light, that is obtained by rotating through 90° a plane of polarization of the P polarized light before passed through the quarter wave length plate 4 first. In other words, the P polarized light, passing through the quarter wave length plate 4 twice in going and returning, has the plane of polarization rotated through 90°, becoming the S polarized light.

Thereafter, the S polarized light thus generated by the quarter wave length plate 4 enters the PBS 3, and due to the function of the PBS 3, the light is then reflected toward t,he photographic paper 6, and is projected onto the photographic paper 6 via the printing lens 7.

After the projection of the blue light is finished in this manner, then, the BGR wheel 2 is rotated so that the color filters 2b and 2c (see FIG. 3) are in turn positioned on the optical path, for exposure by green light and red light in the same manner as described above with respect to the photographic paper 6 disposed at the same position. With such exposure by the three color lights, one unit of an image is printed as a color image onto the photographic paper 6. Thereafter, the photographic paper 6 is transported, so that another unit of the image is printed by repeating the same operations as described above.

As stated hereinbefore, the present photograph printing device, if the DMD 5 is regarded as one device as a whole, is designed so that the optical components therein are arranged in a manner such that light from the light source 1 is made incident perpendicularly to the DMD 5 while light used for exposure outgoes perpendicularly from the DMD 5. In contrast to the prior art wherein light has to be made incident and outgo to and from the DMD with inclination at certain angles thereby requiring a large space to arrange optical components, the foregoing present arrangement allows such angles to become smaller, as particularly clear from that the respective angles of incidence and reflection with respect to the DMD 5 during exposure of the photographic paper 6 are substantially 0° each. Therefore, the present arrangement does not requires a large space for arrangement of the optical components. Therefore, the components in the vicinity of the light source can be tightly arranged, thereby allowing the device to be formed remarkably compact. Furthermore, there is another advantage in that designing of the device is easier, as compared with the arrangement in which light is obliquely projected to the DMD as in conventional cases.

Figure 7:
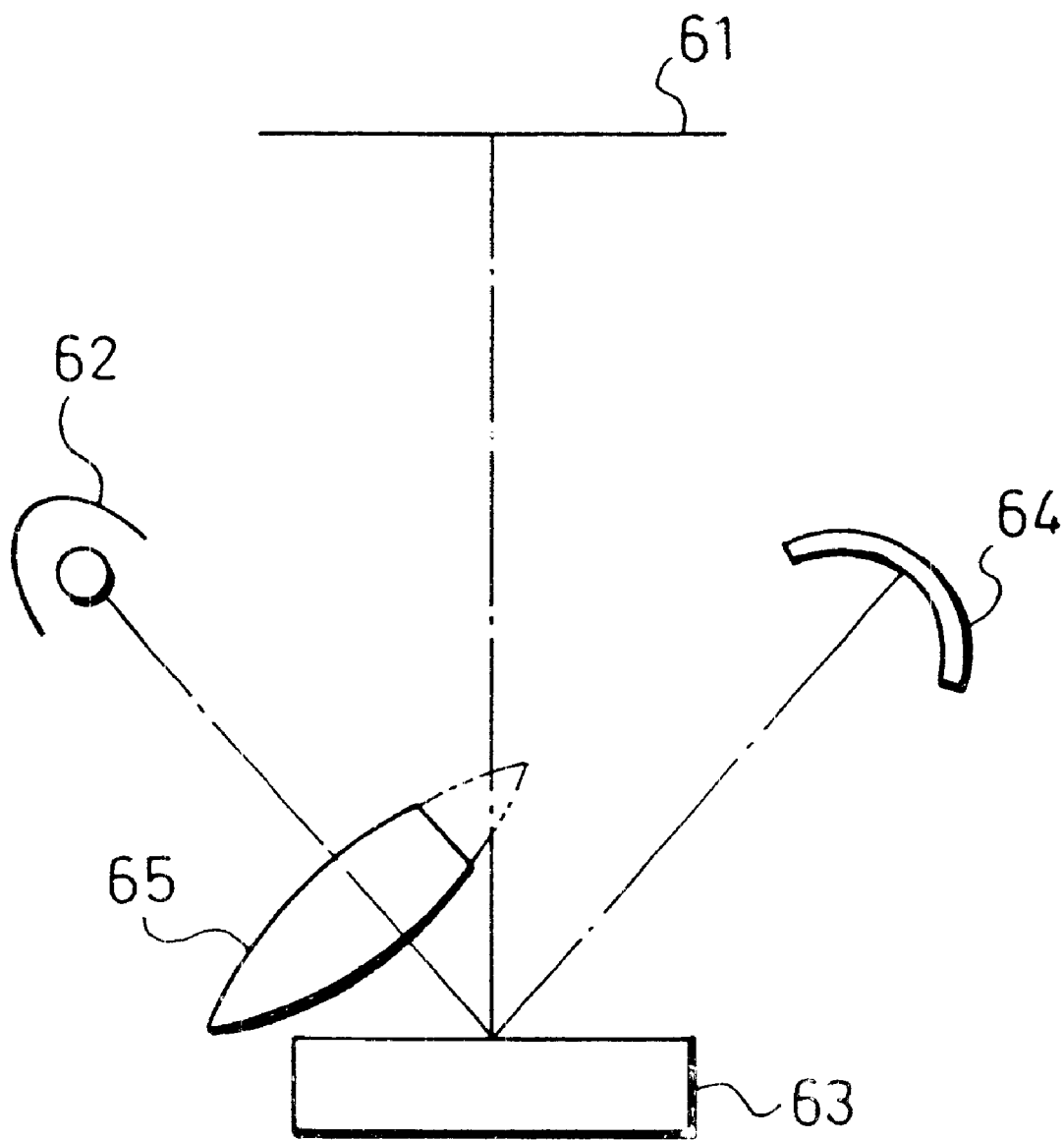
FIG. 7 is an explanatory view illustrating a schematic arrangement of a conventional photograph printing device.

Furthermore, as described hereinbefore, in prior art, to prevent a condenser lens for converging light from a light source to a DMD from partially interfering with light reflected by the DMD, a portion of the condenser lens which would cause the foregoing interference is cut out by D cutting (see FIG. 7). The D cutting is very difficult to apply as a processing operation with respect to glass products, thereby causing costs to rise. In contrast, in the present photograph printing device wherein the condenser lens 8 is not positioned in the optical path between the DMD 5 and the photographic paper 6, the condenser lens 8 never interferes with the light reflected by the DMD 5. Therefore, the D cutting that was conventionally required is unnecessary, thereby enabling the lowering of the price of the device.

Incidentally, the foregoing description of the present embodiment explains an example in which the light modulating means is composed of the DMD 5, but the light modulating means may be composed of, for example, a reflection-type liquid crystal display (LCD) device. The reflection-type LCD device is arranged as follows, for example: a liquid crystal panel is composed of a transparent substrate provided with TFTs (thin film transistors) as active elements at positions corresponding to pixels (the substrate is hereinafter referred to as TFT substrate), a transparent counter substrate on which counter electrodes are formed, and a liquid crystal layer sandwiched by the TFT substrate and the counter substrate, and a reflection plate for reflecting, through the liquid crystal layer, light which is incident thereto from outside is provided outside the liquid crystal panel. This reflection-type LCD device varies transmissivity of light reflected by the reflection plate and transmitted through the liquid crystal layer, by controlling a voltage applied to the liquid crystal layer at each pixel in accordance with image data. Therefore, such a reflection-type LCD device has a function as light modulating means for modulating light from a light source at each pixel in accordance with image data. In short, in the case where the reflection-type LCD device is, in the place of the DMD 5, applied to the present embodiment described above, the same effect as that of the present embodiment can be achieved.

Particularly, in the case where the reflection-type LCD device is arranged so as to include color filters of red (R), green (G), and blue (B), supply of lights of these colors R, G, and B to the photographic paper 6 can be enabled only by supplying white light to the reflection-type LCD device. In other words, it is unnecessary to provide the BGR wheel 2 as in the present embodiment described above for obtaining one unit of image by projecting blue light, green light, and red light in turn to the reflection-type LCD device for exposure. Therefore, in this case, such a decrease in the number of components of the device leads to simplification of the arrangement of the device, which makes it possible to form the device further more compact. Besides, since blue, green, and red colors can be projected at once onto the photographic paper 6 to form one unit of image, the printing is made further speedier.

Incidentally, the PBS 3 in the present embodiment is composed of a polarizing beam splitter which lets P polarized light therethrough and reflects S polarized light, but it may be composed of a polarizing beam splitter which lets S polarized light therethrough and reflects P polarized light, while the other optical components remain arranged in the same manner. In this case, needless to say, the same effect as that in the present embodiment can be achieved.

Figure 5:
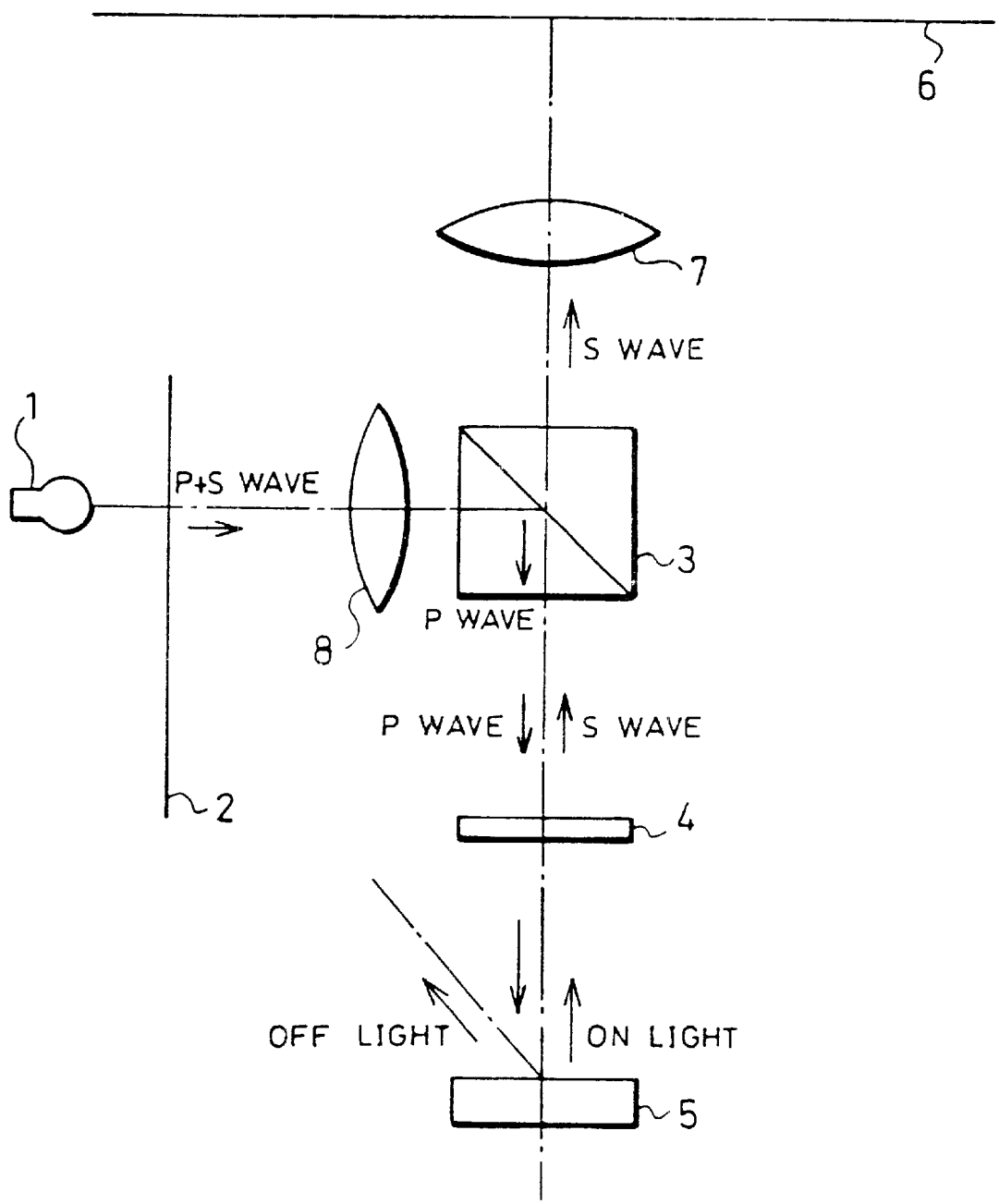
FIG. 5 is an explanatory view illustrating another arrangement of the foregoing photograph printing device.
Figure 6A:
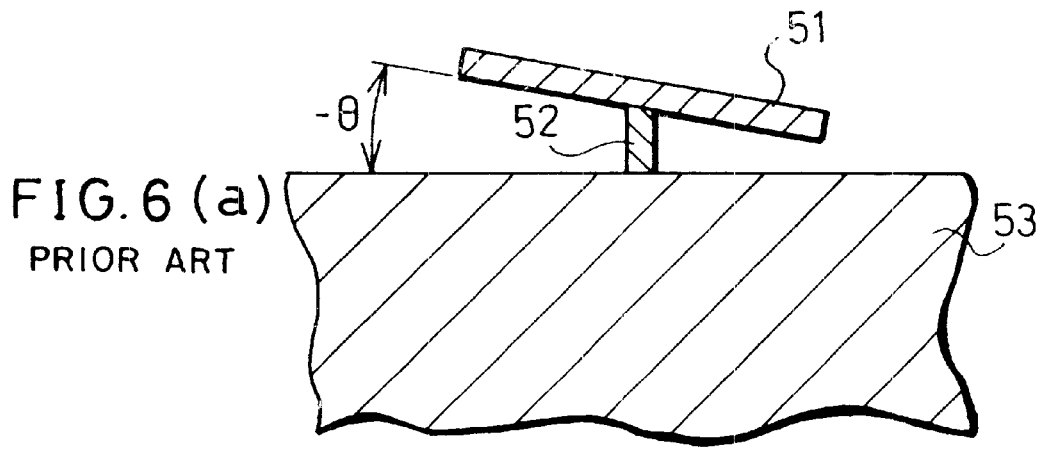
FIG. 6(a) is a cross-sectional view illustrating state of a micromirror during exposure of photographic paper in a conventional photograph printing device equipped with a DMD.
Figure 6B:
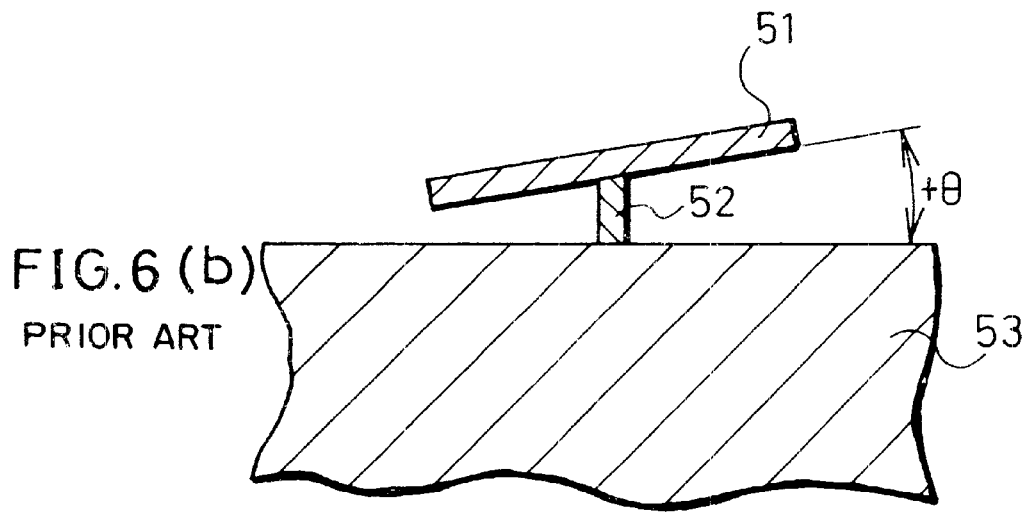
FIG. 6(b) is a cross-sectional view illustrating a state of the micromirror during non exposure of photograph paper in the same device.

Incidentally, the PBS 3 in the present embodiment is composed of a polarizing beam splitter of a transmission-reflection type which lets P polarized light from the light source 1 therethrough and reflects S polarized light from the quarter wave length plate 4, but it may be a polarizing beam splitter of a reflection-transmission type which reflects P polarized light (or S polarized light) from the light source 1 and lets S polarized light (or P polarized light) from the quarter wave length plate 4 therethrough. In this case, the optical components are arranged as shown in FIG. 5. Specifically, the DMD 5, the quarter wave length plate 4, the PBS 3, the printing lens 7, and the photographic paper 6 are linearly disposed in this order, while the light source 1, the BGR wheel 2, and the condenser lens 8 are arranged so that light from the light source 1 which enters the PBS 3 via the BGR wheel 2 and the condenser lens 8 is reflected by the PBS 3 in a direction toward the DMD 5. In this arrangement as well, needless to say, the same effect as that of the present embodiment can be achieved.

Note that the arrangements of constituent components described above are mere examples, and the arrangement is never limited to these.

As, has been described above, a photograph printing device in accordance with the present invention, which is equipped with light modulating means for modulating light from a light source at each pixel in accordance with image data and prints an image on a photosensitive material by means of light obtained through the light modulating means, may be arranged so as to further include an optical element for guiding the light from the light source to the light modulating means, while guiding light modulated by the light modulating means to the photosensitive material, the optical element being positioned in an optical path between the light source and the light modulating means, and the device may be further arranged so that the light modulating means is disposed so that light from the optical element is made incident perpendicularly onto the light modulating means.

With the foregoing arrangement, the light from the light source is projected through the optical element onto the light modulating means, and is modulated by the light modulating means in accordance with the image data. Among the light modulated, the light reaching the optical element is guided by the optical element to the photosensitive material. As a result, an image in accordance with the image data is printed on the photosensitive material.

Here, since the light modulating means is disposed so that the light from the optical element is made incident perpendicularly thereto, a large space is not required for arrangement of the constituent components, unlike the conventional cases where light is incident onto the light modulating means with inclination at a certain angle. In other words, since in the foregoing arrangement the constituent components are arranged so that the angle of incidence of light with respect to the light modulating means becomes approximately 0°, the space for arrangement of the constituent components can be made smaller as compared with the conventional cases. As a result, the device can be made drastically smaller as compared with the conventional cases.

The photograph printing device of the present invention arranged as described above may be further arranged so as to further include phase difference generating means for generating a phase difference between a horizontal component and a vertical component of incident light, the phase difference generating means being positioned in an optical path between the optical element and the light modulating means.

With the foregoing arrangement, let light from the optical element entering the phase difference generating means be first light, and the first light is converted into second light while being transmitted through the phase difference generating means, modulated by the light modulating means, and again transmitted through the phase difference generating means, the second light having a different oscillation direction from that of the first light. With this, the foregoing optical element can be composed of a polarizing beam splitter which transmits (reflects) the first light toward the light modulating means while reflects (transmits) the second light toward the photosensitive material. In other words, a known optical component can be adapted so as to be used as the optical element.

The photograph printing device of the present invention arranged as described above may be further arranged so that light having been transmitted through the phase difference generating means twice in going and returning is equivalent to light obtained by imparting a phase difference of an odd number of times of one half wave length between a horizontal component and a vertical component of the light before the transmission through the phase difference generating means.

With the foregoing arrangement, in the case where the light before transmission through the phase difference generating means is P polarized light for example, the light becomes S polarized light while being transmitted through the phase difference generating means twice in going and returning. In contrast, in the case where the light before transmission through the phase difference generating means is S polarized light, the light becomes P polarized light while being transmitted through the phase difference means twice in going and returning.

Therefore, it is possible to print images with respect to the photosensitive material by utilizing two linearly polarized lights having different planes of polarization.

The photograph printing device of the present invention arranged as described above may be further arranged so that the foregoing phase difference generating means is a quarter wave length plate.

With the foregoing arrangement wherein the phase difference generating means is a quarter wave length plate, P polarized light is surely converted to S polarized light as well as S polarized light is surely converted to P polarized light, by transmission of light through the quarter wave length plate twice in going and returning.

Furthermore, the photograph printing device of the present invention arranged as described above may be further arranged so that the light modulating means is a digital micromirror device including a plurality of micromirrors, the micromirrors being arranged in a matrix form so as to correspond to the pixels and being arranged so as to swing in accordance with image data.

With the foregoing arrangement, an image in accordance with the image data can be surely printed on the photosensitive material by causing each micromirror which reflects incident light from the light source to swing in accordance with the image data.

Furthermore, the photograph printing device in accordance with the present embodiment arranged as described above may be further arranged so that each of the micromirrors is disposed so that (i) for exposure of the photographic material, a light reflecting surface of the micromirror becomes perpendicular to an optical axis connecting the optical element and the light modulating means, and (ii) for non-exposure of the photographic material, the light reflecting surface thereof inclines with respect to the optical axis.

With the foregoing arrangement, for exposure of the photosensitive material, the light projected through the optical element onto the micromirror is reflected again toward the optical element and is guided to the photosensitive material due to function of the optical element, whereas, for non-exposure of the photosensitive material, the light is reflected by the micromirror not toward the optical element. Thus, the inclination of each micromirror changes depending on whether the photosensitive material is to be exposed or not to be exposed, resulting in that exposure/non-exposure of the photosensitive material can be surely switched.

Furthermore, the photograph printing device of the present invention arranged as described above may be further arranged so that the light modulating means is a reflection-type liquid crystal display device which controls outgoing of light at each pixel in accordance with image data.

With the foregoing arrangement, since in the reflection-type LCD device, reflection of light supplied to the reflection-type LCD device toward the optical element is controlled at each pixel in accordance with the image data, an image in accordance with the image data can be surely printed on the photosensitive material, as in the case where the light modulating means is composed of the digital micromirror device.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A photograph printing device for printing an image by selectively evenly exposing a photosensitive material layer to light, said photograph printing device comprising:

a light source;

light modulating means including a plurality of elements corresponding to pixels of the image to be printed for modulating light from said light source in accordance with image data; and an optical element positioned in an optical path between said light source and said light modulating means, said optical element being adapted for guiding light from said light source to said light modulating means, and for guiding light from said light modulating means to said photosensitive material layer;

wherein said light modulating means comprises a digital micromirror device including a plurality of micromirrors, each said micromirror being separately attached to an underlying substrate and defining an outwardly facing reflective surface, said micromirrors being arranged in a matrix form so as to correspond to said pixels and being adapted for movement relative to said optical element and to said underlying substrate in accordance with said image data such that (a) for exposure of said photosensitive material layer at locations corresponding to selected ones of said pixels, the light reflecting surfaces of the micromirrors corresponding to said selected ones of said pixels are set perpendicular to an optical axis perpendicularly connecting said optical element and said light modulating means; and (b) for non-exposure of said photosensitive material layer at locations corresponding to non-selected ones of said pixels, the light reflecting surfaces of the micromirrors corresponding to the non-selected ones of said pixels are set at angles relative to said optical axis such that light reflected therefrom cannot reach said photosensitive layer via said optical element.

2. The photograph printing device as set forth in claim 1, wherein said light modulating means is disposed so that light from said optical element is made incident perpendicularly onto said light modulating means.

3. The photograph printing device as set forth in claim 1, wherein said light modulating means reflects light from said optical element at least at pixels to expose said photosensitive material, so as to cause the light to again enter said optical element.

4. A photograph printing device as set forth in claim 1, wherein said light modulating means causes light to outgo therefrom in a direction opposite to a direction of incidence of light from said optical element, at least at pixels to expose said photosensitive material.

5. The photograph printing device as set forth in claim 1, further comprising phase difference generating means for generating a phase difference between a horizontal component and a vertical component of incident light, said phase difference generating means being positioned in an optical path between said optical element and said light modulating means.

6. The photograph printing device as set forth in claim 5, wherein light having been transmitted through said phase difference generating means twice in going and returning is equivalent to light obtained by imparting a phase difference of an odd number of times of one half wave length between a horizontal component and a vertical component of the light before the transmission through said phase difference generating means.

7. The photograph printing device as set forth in claim 6, wherein said phase difference generating means is composed of a quarter wave length plate.

8. The photograph printing device as set forth in claim 6, wherein said optical element is a polarizing beam splitter.

9. The photograph printing device as set forth in claim 8, wherein said polarizing beam splitter transmits the light from said light source, and reflects the light from said light modulating means.

10. The photograph printing device as set forth in claim 8, wherein said polarizing beam splitter reflects the light from said light source, and transmits the light from said light modulating means.

11. The photograph printing device as set forth in claim 1, further comprising a condenser lens in an optical path between said light source and said optical element.

12. The photograph printing device as set forth in claim 1, further comprising a printing lens in an optical path between said optical element and said photosensitive material.

13. The photograph printing device as set forth in claim 1, wherein said light modulating means has a light modulating region which is provided symmetrically with respect to a plane including said optical axis connecting said optical element and said light modulating means.

* * * * *

UNITED STATES PATENT AND TRADEMARK OFFICE
CERTIFICATE OF CORRECTION

PATENT NO. : 6,456,359 B1
DATED : September 24, 2002
INVENTOR(S) : Hidetoshi Nishikawa and Kazuya Tsukamoto It is certified that error appears in the above-identified patent and that said Letters Patent is hereby corrected as shown below:

<u>Title page,</u>
Item [*], Notice, please delete: "Subject to any disclaimer, the term of this patent is extended or adjusted under 35 U.S.C. 154(b) by 43 days." and substitute therefor:
-- Subject to any disclaimer, the term of this patent is extended or adjusted under 35 U.S.C. 154(b) by 143 days --

Signed and Sealed this

Fourth Day of February, 2003

JAMES E. ROGAN
*Director of the United States Patent and Trademark Office*

UNITED STATES PATENT AND TRADEMARK OFFICE
CERTIFICATE OF CORRECTION

PATENT NO.     : 6,456,359 B1
DATED          : September 24, 2002
INVENTOR(S)    : Hidetoshi Nishikawa and Kazuya Tsukamoto It is certified that error appears in the above-identified patent and that said Letters Patent is hereby corrected as shown below:

<u>Title page,</u>
Item [56], References Cited, U.S. PATENT DOCUMENTS please change "5,808,500 dated 9/1998 Handschy et al. 359/630 to -- 5,808,800 dated 9/1998 Handschy et al. 359/630 --

Signed and Sealed this

Eleventh Day of February, 2003

JAMES E. ROGAN
*Director of the United States Patent and Trademark Office*